Jan. 11, 1949.  F. C. WALLACE  2,458,753
BORING HEAD
Filed June 26, 1944

INVENTOR
Frank C. Wallace
BY
ATTORNEY

Patented Jan. 11, 1949

2,458,753

UNITED STATES PATENT OFFICE 2,458,753

BORING HEAD

Frank C. Wallace, North Hollywood, Calif.

Application June 26, 1944, Serial No. 542,189

3 Claims. (Cl. 77—58)

My invention relates to boring heads for use in jig boring machines, milling machines, lathes and other machine tools, and has for one of its objects the provision of a tool which may be quickly and accurately adjusted without the use of wrenches or other adjusting tools.

Another object is the provision of a tool of this character which has simple, economical and durable construction.

My invention has additional features of novelty and advantage which will become apparent from the following detailed description of one of the practical physical forms in which it may be carried out, for which purposes I shall refer to the accompanying drawings, in which.

Figure 2:
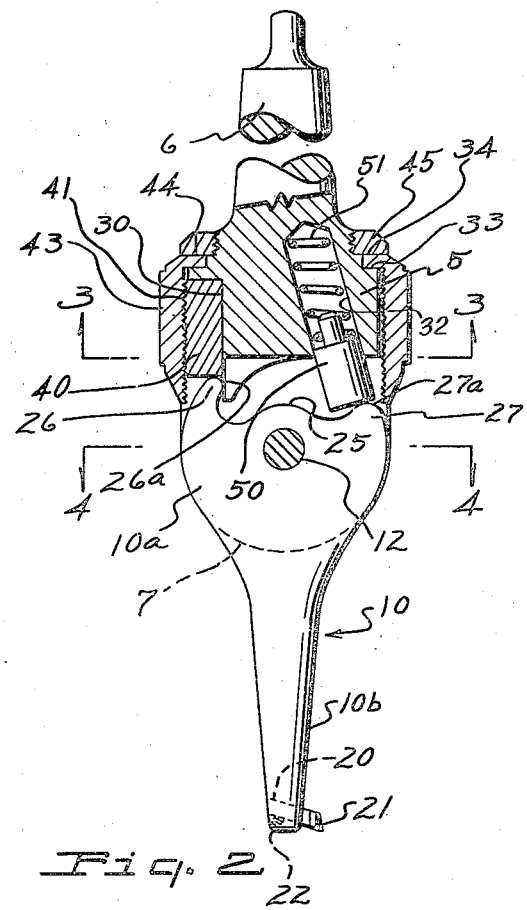
Fig. 2 is a medial vertical section with some parts in elevation.
Figure 3:
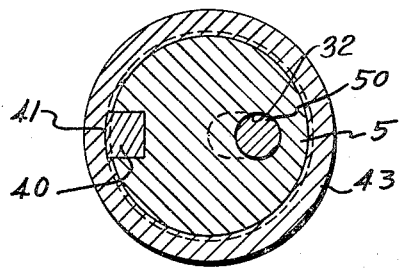

Fig. 3. is a section on line 3—3 of Fig. 2; and

Figure 4:
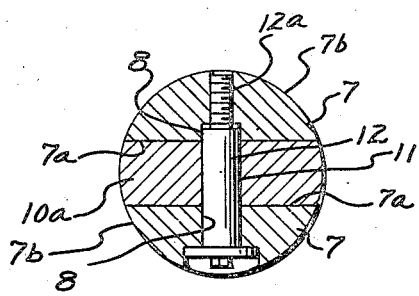

Fig. 4 is a section on line 4—4 of Fig. 2.

Referring now to the drawings, I show at 5 a body of round cross-section having a shank 6 for securing the device in a machine tool. While I illustrate a tapered shank it will be understood that any suitable form and shape of shank may be utilized without departing from the invention.

The bottom portion of the body is bifurcated to provide spaced depending bosses 7, each having a flat inner face 7a and a spherical outer face 7b. The bosses 7 have alined transverse openings 8.

A boring bar 10 has a disc-like upper portion 10a provided with a transverse opening 11 to receive a spindle 12 which latter also extends through openings 8. The spindle member is in the form of a cap screw having a hexagonal head portion and a reduced, threaded inner end 12a which threads into the threaded reduced diameter portion of the opening 8 in one of the members 7. The outer portion 10b of the boring bar is tapered and has a diagonal opening 20 to receive the shank of a cutter bit 21 held in position by a set screw 22.

The disc portion 10a is provided with a peripheral recess 25 and presents a circumferentially disposed finger 26 having a rounded end 26a, and a second finger 27 having a curved end 27a. It will be observed that the disc portion 10a of the boring bar is adapted to rotate about the axis of the spindle 12 to laterally swing the cutter bit carrying portion 10b about a radius into the desired position of lateral adjustment relative to the longitudinal axis of the body.

The body also has a longitudinally disposed peripheral recess 30, a diagonal, downwardly opening recess 32 and annular shoulders 33, 34, for the purpose to be described.

Mounted to move longitudinally of the recess 30 I provide a travelling block 40 whose rounded outer surface is threaded at 41 to be engaged by the internally threaded thimble or sleeve 43 rotatably mounted on the body. The thimble has an inwardly disposed annular top flange 44 which rotates against shoulder 33, being releasably held against the shoulder by an assembly ring 45 threaded on to the body against shoulder 34. The bottom end of the block 40 engages the curved end surface 26a of the finger 26 to cause rotation of the boring bar about the spindle 12, thereby swinging the bit-carrying portion of the bar laterally with respect to the longitudinal axis of the body. This swinging movement of the bar is yieldably opposed by plunger 50 reciprocally mounted in recess 32, the plunger being loaded by a compression spring 51. The lower beveled peripheral edge of thimble 43 is provided with suitable calibrations C, which scale is rotatable with the thimble with reference to the fixed point D provided on one of the bosses 7, so that the extent of lateral adjustment of the boring bar may be accurately determined.

Figure 1:
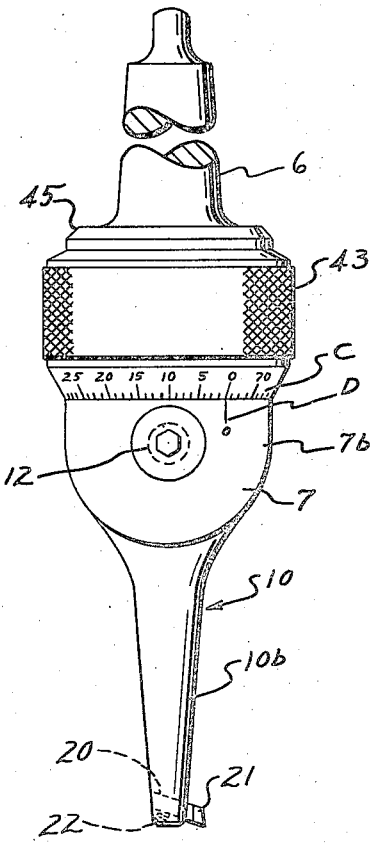
Fig. 1 is a side elevation with the shank broken away.

In operation, the shank 6 is secured, for instance, to the tool post of the lathe, while the work to be bored is held and rotated by a chuck. The thimble is then rotated about the body, causing the travelling block 40 to move downwardly against the end of the finger 26, thus rotating the boring bar about the axis of spindle 12 until the bit is set to bore a hole of the desired diameter. The thimble may be retained in the set position by screwing threaded spindle 12 inwardly. To rotate the boring bar in the opposite direction, the thimble is rotated in the reverse direction, thus moving the traveling block 40 upwardly and allowing the spring-loaded plunger 50 to swing the bar to the left as viewed in Figs. 1 and 2.

While, in the foregoing, I have resorted to considerable detail of structure and association of parts in describing a particular example of my invention, I wish it to be understood that I have done so merely to make my invention understood and that I do not limit my invention to such details. On the contrary, my invention is only to be limited as appears in the appended claims.

I claim:

1. A boring tool comprising a body of round cross-section presenting a pair of bifurcations at its lower end and a shank portion at its top end, said body having a medial portion of reduced diameter providing an upwardly facing shoulder and a longitudinally disposed peripheral slot, a traveling block mounted in said slot for movement longitudinally thereof, said block presenting threads, an internally threaded sleeve rotatably mounted annularly of the reduced diameter portion of the body and bearing at its bottom end against said shoulder, a stop ring threadedly mounted on the body and bearing against the top end of the sleeve, said body presenting a recess opening downwardly between said bifurcations, a tool carrier, means pivotally mounting the carrier adjacent one end between said bifurcations for swinging movement about an axis at right angle to the longitudinal axis of the body, said carrier presenting at its top end a pair of cam followers one at each side of the longitudinal axis of the body, one at each side of the axis of rotation of the carrier, one of said followers having engagement with the bottom end of said block, a spring-loaded plunger reciprocably mounted in said recess and having bearing against said other follower, and tool-holding means at the bottom end of the carrier.

2. A tool holder comprising a body, a tool holder, means pivoting the tool holder in an end of the body to swing in a plane parallel to the longitudinal axis of the body, a block mounted to slide longitudinally in the body, said block having engagement with the inner end of the tool holder at a point laterally offset from its axis of swinging movement whereby to swing the tool holder in response to sliding movement of the block, and a sleeve mounted on the body for rotation coaxial therewith, said sleeve and block having cooperating threads operative to slide the block in response to rotation of the sleeve relative to the body.

3. A boring tool comprising an exteriorly threaded body of round cross section having a pair of spaced parallel depending portions, a tool holder pivotally mounted between the depending portions for swinging movement about an axis transverse of the body, said body having a longitudinal slot opening through its periphery, a threaded traveling block mounted to move longitudinally in the slot for engagement with the top end of the tool holder at a point laterally offset from the axis of movement thereof, a sleeve mounted on the body for rotation coaxial therewith, said sleeve having internal threads engageable with the threaded traveling block to move the latter in response to rotation of the sleeve relative to the body, and yieldable means between the body and the top end of the tool holder opposing swinging movement of the tool holder in one direction.

FRANK C. WALLACE.

REFERENCES CITED

The following references are of record in the file of this patent:

UNITED STATES PATENTS

| Number | Name | Date |
| --- | --- | --- |
| 1,980,178 | Berglund | Nov. 13, 1934 |
| 2,333,233 | Bold | Nov. 2, 1943 |
| 2,369,875 | Wanelik | Feb. 20, 1945 |

FOREIGN PATENTS

| Number | Country | Date |
| --- | --- | --- |
| 28,967 | Great Britain | 1909 |
| 36,395 | Norway | Dec. 18, 1922 |
| 84,483 | Switzerland | Aug. 18, 1919 |
| 356,083 | Germany | July 12, 1922 |